United States Patent [19]

Rosenberg

[11] Patent Number: 5,201,342
[45] Date of Patent: Apr. 13, 1993

[54] PULSATOR DEVICE

[76] Inventor: Peretz Rosenberg, Moshav Beit Shearim, Israel

[21] Appl. No.: 847,536

[22] Filed: Mar. 6, 1992

Related U.S. Application Data

[62] Division of Ser. No. 633,890, Dec. 26, 1990, abandoned.

[30] Foreign Application Priority Data

Dec. 26, 1989 [IL] Israel ........................................ 92886

[51] Int. Cl.[5] ............................................. F16K 51/00
[52] U.S. Cl. ................................. 137/624.14; 137/403
[58] Field of Search ........................... 137/624.14, 403; 239/99

[56] References Cited

U.S. PATENT DOCUMENTS 2,650,615 9/1953 Nesham ........................... 137/624.14
4,949,747 8/1990 Rosenberg ................. 137/624.14 X

FOREIGN PATENT DOCUMENTS 507711 4/1976 U.S.S.R. ........................ 137/624.14
640052 12/1978 U.S.S.R. .

Primary Examiner—Alan Cohan
Attorney, Agent, or Firm—Benjamin J. Barish

[57] ABSTRACT

A pulsator device includes a water chamber having a small inlet orifice for inletting pressurized water at a relatively low rate in a continuous manner, and a large outlet orifice. An outlet valve assembly controls the large outlet orifice to open it at a relatively high chamber pressure and to close it at a relatively low chamber pressure. The outlet orifice is one end of a hollow stem passing through a wall of the water chamber. The outlet valve assembly includes an expansible/contractible control chamber and a valve member effective, in the normal expanded condition of the control chamber, to close the one end of the hollow stem, and in the contracted condition of the control chamber to open the one end of the hollow stem, and thereby to output pulses of pressurized water through the hollow stem.

8 Claims, 1 Drawing Sheet

PULSATOR DEVICE

RELATED APPLICATION

The present application is a division of U.S. Pat. application Ser. No. 07/633,890 filed Dec. 26, 1990, now abandoned.

FIELD AND BACKGROUND OF THE INVENTION

The present invention relates to pulsator devices, and particularly to such devices for use in pulse-irrigation systems, such as described in my prior U.S. Pat. Nos. 4,781,217 and 4,949,747.

The above patents describe pulsator devices which include a housing defining a water chamber having an inlet including a small inlet orifice for inletting pressurized water at a relatively low rate in a continuous manner, and a relatively large outlet orifice controlled by an outlet valve assembly which opens at a high pressure above atmosphere and closes at a lower pressure above atmosmphere so as to outlet the water in the form of pulses. Water may thus be continuously introduced at a low rate into the chamber, thereby continuously increasing the pressure within the chamber until the outlet valve opens, at which time the outlet valve discharges the water at a high rate via the large outlet orifice until the pressure within the housing drops to the predetermined low value, at which time the outlet valve recloses. Such pulsator devices are used, among other applications, in water irrigation systems to enable sprinklers and other irrigation devices to be fed with water continuously at a relatively low rate and to discharge the water periodically at a relatively high rate.

OBJECTS AND BRIEF SUMMARY OF THE INVENTION

An object of the present invention is to provide an improvement in such pulsator devices, particularly in the outlet valve assembly of such devices, as will be described more particularly below.

According to the present invention, there is provided a pulsator device comprising a housing connectible to a source of pressurized water and defining a water chamber therein having an inlet for inletting pressurized water at a relatively low rate in a continuous manner, and a large outlet orifice; and an outlet valve assembly controlling the large outlet orifice to open it in response to a relatively high pressure in the water chamber and to close it in response to a relatively low pressure in the water chamber so as to output the water from the water chamber in the form of pulses. The outlet orifice is at one end of a hollow stem having an opposite end passing through a wall of the water chamber. The outlet valve assembly comprises an expansible/contractible control chamber located within and enclosed by the water chamber and normally biassed to its expanded condition but being contractible by a high pressure in the water chamber to a contracted condition. A valve member is carried by the control chamber and is effective, in the normal expanded condition of the control chamber to close the one end of the hollow stem, and in the contracted condition of the control chamber to open the one end of the hollow stem and thereby to output a pulse of pressurized water through the opposite end of the hollow stem.

According to further features in the described preferred embodiment, the control chamber includes a fixed wall fixed within the water chamber, and a displaceable wall movable towards the one end of the hollow stem upon the expansion of the control chamber, and away therefrom upon the contraction of the control chamber. The valve member is carried by the movable wall of the control chamber. One end of the hollow stem is adjacent a bottom wall of the water chamber, and the opposite end of, the hollow stem passes through a top wall of the water chamber. The control chamber is located between the bottom wall of the water chamber and the one end of the hollow stem. In addition, the inlet orifice is formed at one end of an inlet assembly, the opposite end of the inlet assembly passing through the bottom wall of the water chamber.

An important advantage in such a pulsator device is that it may be constructed without slidable seals between relatively movable parts. Such devices thus avoid both the loss of energy, and the increase in wear, caused by friction between relatively movable parts to be maintained in sealed relation. This increases the reliability of the device over long periods of operation, and reduces the need for maintenance or repair because of wearing seals.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
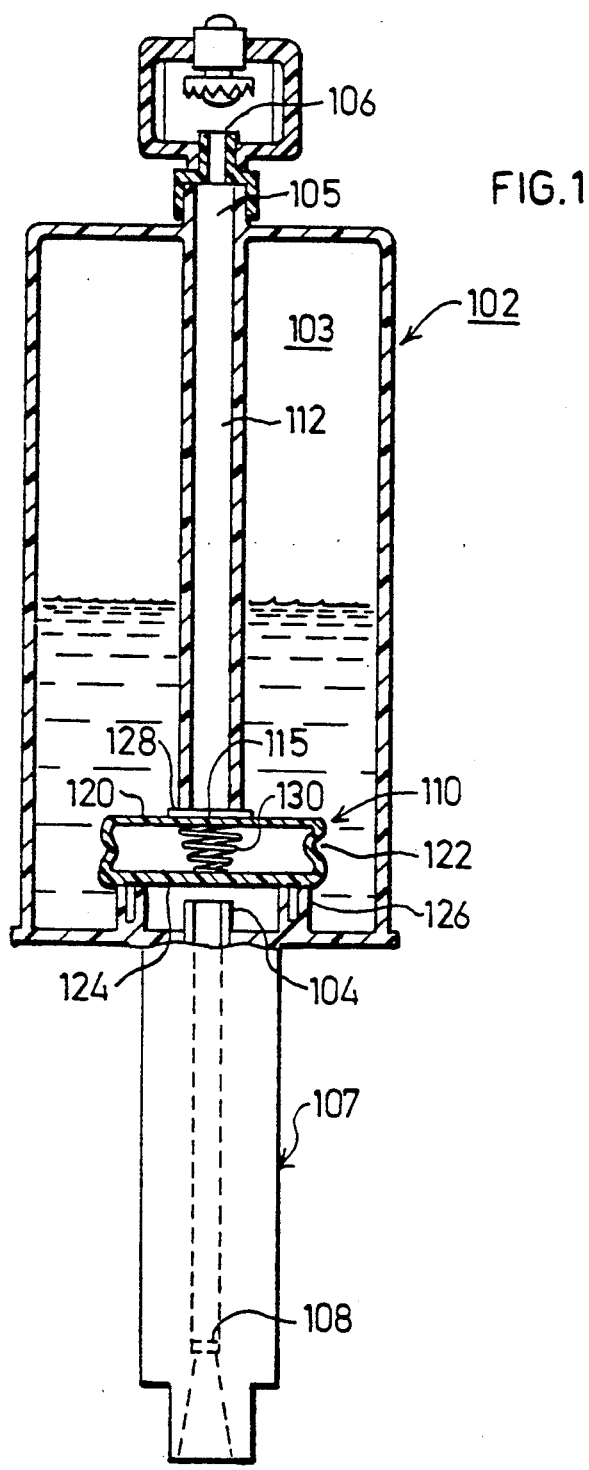
FIGS. 1 and 2 are partial longitudinal sectional views illustrating one form of pulsator device constructed in accordance with the present invention, the pulsator device being shown with its outlet valve assembly in the initial open condition in FIG. 1, and in the closed condition in FIG. 2.

The device illustrated in the drawings includes a housing 102 defining a water chamber 103, an inlet port 104 into the chamber, an outlet port 105 leading to a sprinkler 106, an inlet assembly 107 formed with a restrictor orifice 108 for inletting the water continuously at a slow rate into chamber 103, and an outlet valve assembly 110 for discharging the water periodically at a high rate. The outlet valve assembly 110 includes a hollow stem 112 extending through water chamber 103 and terminating adjacent its lower end in an outlet orifice 115. The opposite end of the hollow stem serves as the outlet port 105 communicating with the atmosphere via sprinkler 106.

Figure 2:
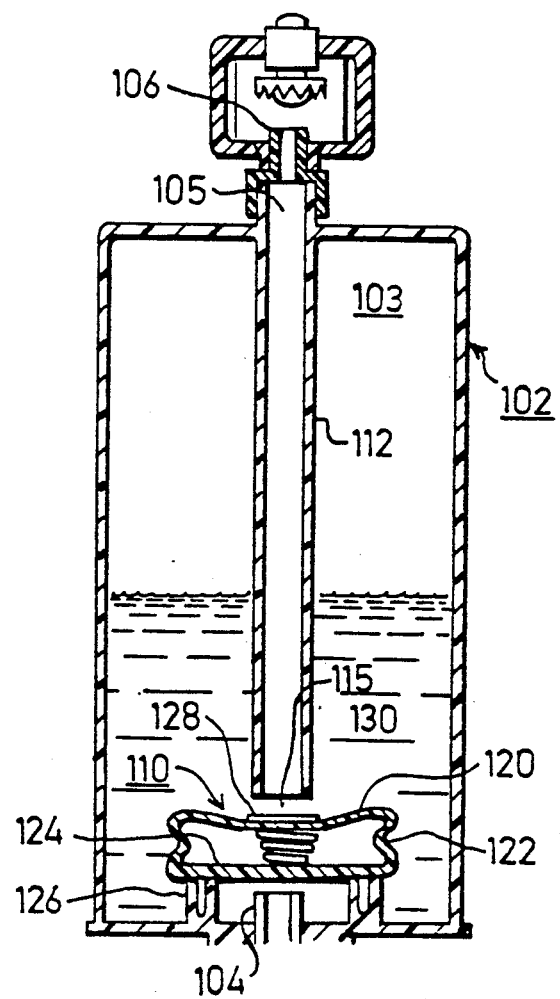

Expansible chamber 122 includes a rigid bottom wall 124 fixed to the bottom wall of housing 102 by a plurality of circumferentially-spaced feet 126 around the inlet port 104. The top wall 120 of expansible chamber 122 carries a sealing strip 128 which serves as a displaceable valve member and underlies the outlet orifice 115. Chamber 122 is normally in an expanded condition as shown in FIG. 1, such that sealing strip 128 carried by its top wall 120 engages and closes the outlet orifice 115 end of stem 112, but may be contracted to open the orifice as shown in FIG. 2. For this purpose, expansible chamber 122 is a sealed chamber containing a gas and may have a bellows-type side wall normally retaining the chamber in its expanded condition. It preferably includes an internal spring 130 biassing sealing strip 128 into engagement with the outlet orifice 115.

The pulsator device illustrated in the drawings operates as follows:

In its initial condition, with no water in chamber 103, expansible chamber 122 is in its expanded condition with its sealing strip 128 engaging the outlet orifice 115, as shown in FIG. 1. Accordingly, as water is inletted continuously and at a low rate via the inlet assembly 107, its restrictor 108, and the inlet port 104 into chamber 103, the water starts to fill the chamber while the outlet port 115 is closed by the sealing strip 128, thereby building up the pressure within chamber 103.

The pressure within chamber 103 is applied uniformly over the complete surface of the expansible chamber 122, except for the area of its top wall 120 enclosed by the outlet orifice 115, which latter area is exposed to the atmosphere via the hollow tube 112.

Accordingly, as the pressure within the water chamber 103 increases by the rising of the water within that chamber, the differential pressure applied to the top wall 120 of the expansible chamber 122 will therefore also increase, until a point is reached wherein this differential pressure is sufficient to displace the top wall 120 towards its bottom wall 124, thereby opening the outlet orifice 115. As soon as the outlet orifice begins to open, the complete pressure within the chamber is applied to the compete outer surface of the top wall 120, increasing the opening force applied to the top wall so that a snap-action opening of the outlet orifice 115 is effected.

As soon as the outlet orifice 115 is opened, the pressure within the water chamber 103 produces a high-rate discharge of water to the sprinkler 106 via the hollow stem 112 and its outlet port 105. This discharge of water quickly reduces the pressure within the water chamber, until the pressure drops to the point where the force applied to the top wall 120 is less than the biassing force (e.g., spring 130). As soon as this occurs, the top wall 120 moves upwardly to cause its sealing strip 128 to engage the outlet orifice 115, and thus to terminate the discharge through the outlet orifice.

The inlet assembly 107 is preferably of the same structure as described in my U.S. Pat. No. 4,949,747 to include the self-flushing feature which flushes the inlet assembly, including its restrictor orifice 108, upon the shutting-off of the water supplied to the inlet assembly. The device illustrated in the drawings is preferably designed so that the outlet orifice 115 is opened when the water rises to about two-thirds the height of chamber 103, and recloses when the water drops to about one-third the height of the chamber, so that each discharge will be a quantity of about one-third the volume of the chamber.

It will thus be seen that the above described device obviates the need for slidable seals between relatively movable parts, and thus avoids both the loss of energy, and the increase in wear, caused by friction between relatively movable parts. Such a construction therefore increases the reliability of the device over long periods of operation, and reduces the need for maintenance or repair because of wearing seals.

While the invention has been described with reference to a preferred embodiment, it will be appreciated that this is set forth for purposes of example only, and that many other variations, modifications and applications of the invention may be made.

What is claimed is:

1. A pulsator device, comprising:
    a source of pressurized water;
    a housing connectible to said source of pressurized water and defining a water chamber therein having an inlet for inletting water at a relatively low rate in a continuous manner, and a large outlet orifice;
    an outlet valve assembly controlling said large outlet orifice to open it in response to a relatively high pressure in said water chamber and to close it in response to a relatively low pressure in said water chamber so as to output the water from the water chamber in the form of pulses;
    said outlet orifice being one end of a hollow stem having an opposite end passing through a wall of the water chamber;
    said outlet valve assembly comprising an expansible/contractible control chamber located within and enclosed by said water chamber and normally biassed to its expanded condition but being contractible by a high pressure in the water chamber to a contracted condition;
    and a valve member carried by the control chamber effective, in the normal expanded condition of the control chamber to close said one end of the hollow stem, and in the contracted condition of the control chamber to open said one end of the hollow stem and thereby to output a pulse of pressurized water through said opposite end of the hollow stem.

2. The pulsator device according to claim 1, wherein said control chamber includes a fixed wall fixed within said water chamber, and a displaceable wall movable towards said one end of the hollow stem upon the expansion of the control chamber, and away therefrom upon the contraction of said control chamber, said valve member being carried by said movable wall of the control chamber.

3. The pulsator device according to claim 2, wherein said one end of the hollow stem is adjacent a bottom wall of the water chamber, and the opposite end of the hollow stem passes through a top wall of the water chamber; said control chamber being located between said bottom wall of the water chamber and said one end of the hollow stem.

4. The pulsator device according to claim 3, wherein said inlet orifice is formed at one end of an inlet assembly, the opposite end of the inlet assembly passing through said bottom wall of the water chamber.

5. The pulsator device according to claim 4, wherein said fixed wall of the expansible/contractible control chamber is spaced above said opposite end of the inlet assembly.

6. The pulsator device according to claim 1, wherein said expansible/contractible control chamber is a sealed chamber including an internal spring normally biassing the control chamber to its expanded condition.

7. The pulsator device according to claim 6, wherein said sealed control chamber is filled with a gas.

8. The pulsator device according to claim 1, wherein said opposite end of the hollow stem is coupled to a water sprinkler to supply pulses of pressurized water thereto.

* * * * *